(12) United States Patent
Takeuchi

(10) Patent No.: US 8,803,375 B2
(45) Date of Patent: Aug. 12, 2014

(54) ELECTROMECHANICAL DEVICE, AND MOVABLE BODY AND ROBOT USING ELECTROMECHANICAL DEVICE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 189 days.

(21) Appl. No.: 13/554,331

(22) Filed: Jul. 20, 2012

(65) Prior Publication Data

US 2013/0026861 A1 Jan. 31, 2013

(30) Foreign Application Priority Data

Jul. 25, 2011 (JP) ................................ 2011-161713

(51) Int. Cl.
*H02K 5/00* (2006.01)
(52) U.S. Cl.
USPC .............................................. 310/43; 310/89
(58) Field of Classification Search
USPC ................ 310/43, 89, 201, 156.1, 265, 254.1
See application file for complete search history.

(56) References Cited

U.S. PATENT DOCUMENTS

| | | | | |
|---|---|---|---|---|
| 4,130,769 A | * | 12/1978 | Karube | 310/46 |
| 4,236,295 A | * | 12/1980 | Nakamura | 29/598 |
| 4,492,889 A | | 1/1985 | Fukushi et al. | |
| 4,908,534 A | * | 3/1990 | Gubler et al. | 310/45 |
| 5,698,925 A | * | 12/1997 | Coupart | 310/216.136 |
| 6,144,130 A | | 11/2000 | Kawamura | |
| 6,429,558 B1 | * | 8/2002 | Hisafumi | 310/81 |
| 7,531,932 B2 | * | 5/2009 | Ito et al. | 310/156.34 |
| 7,579,744 B2 | | 8/2009 | Kato | |
| 2003/0127924 A1 | * | 7/2003 | Van Dine et al. | 310/87 |
| 2003/0141774 A1 | | 7/2003 | Komura et al. | |
| 2007/0057593 A1 | * | 3/2007 | Ito et al. | 310/216 |
| 2008/0073992 A1 | * | 3/2008 | Kusama | 310/90 |
| 2009/0295249 A1 | * | 12/2009 | Kinjou et al. | 310/181 |

FOREIGN PATENT DOCUMENTS

| | | |
|---|---|---|
| EP | 0 926 801 | 6/1999 |
| JP | 58-201555 | 11/1983 |
| JP | 59-096843 | 6/1984 |
| JP | 04-091644 | 3/1992 |
| JP | 10-210690 | 8/1998 |
| JP | 11-196555 | 7/1999 |
| JP | 2002-322978 | 11/2002 |
| JP | 2003-299278 | 10/2003 |
| JP | 2006-174554 | 6/2006 |
| JP | 2006-345627 | 12/2006 |
| JP | 2007-170182 | 7/2007 |
| WO | 00-17524 | 3/2000 |

\* cited by examiner

*Primary Examiner* — Thanh Lam
(74) *Attorney, Agent, or Firm* — Harness, Dickey & Pierce, P.L.C.

(57) ABSTRACT

An electromechanical device includes a rotor having a magnetic back yoke with a cylindrical shape, and at least one rotor magnet arranged along an outer periphery of the magnetic back yoke in a cylindrical manner, a stator having at least one air-core magnetic coil arranged along an outer periphery of the rotor in a cylindrical manner, and a coil back yoke with a cylindrical shape disposed on an outer periphery of the magnetic coil arranged in a cylindrical manner, and a casing adapted to cover the stator and the rotor, wherein at least a part of the casing is formed of carbon fiber reinforced plastic.

18 Claims, 8 Drawing Sheets

ELECTROMECHANICAL DEVICE, AND MOVABLE BODY AND ROBOT USING ELECTROMECHANICAL DEVICE

BACKGROUND

1. Technical Field

The invention relates to an electromechanical device, and a movable body and a robot each using the electromechanical device.

2. Related Art

As an example of a rotary electric appliance (also referred to as an "electromechanical device" in the present specification) such as an electric motor or an electric generator, there can be cited an inner-rotor coreless electromechanical device provided with a rotor having permanent magnet disposed to have a roughly cylindrical shape as a rotor magnet, and a stator having an air-cored (coreless) magnetic coil disposed to have a roughly cylindrical shape in the outer periphery of the rotor. As a casing of the electromechanical device, there has been used in the past a metal easy to provide sufficient light-weight property, strength property, heat-resistance property, and so on such as an aluminum alloy.

Here, although the magnetic flux from the rotor magnet is basically arranged to close as a magnetic circuit on the inner side of a coil back yoke disposed in the outer periphery of the magnetic coil, in reality, leakage of the magnetic flux occurs on the outer peripheral side of the coil back yoke due to the arrangement for downsizing. Therefore, eddy current is caused in the casing covering the stator in the outer periphery of the coil back yoke, and the loss due to the eddy current thus caused, namely the so-called eddy-current loss, hinders an improvement inefficiency of the electromechanical device.

JP-A-10-210690 and JP-A-2002-322978 are examples of a related art document.

SUMMARY

An advantage of some aspects of the invention is to provide a technology capable of reducing the eddy-current loss generated in the casing of the electromechanical device.

Application Example 1

This application example is directed to an electromechanical device including a rotor having a magnetic back yoke with a cylindrical shape, and at least one rotor magnet arranged along an outer peripheral surface of the magnetic back yoke in a cylindrical manner, a stator having at least one air-core magnetic coil arranged along an outer periphery of the rotor in a cylindrical manner, and a coil back yoke with a cylindrical shape disposed on an outer periphery of the magnetic coil arranged in a cylindrical manner, and a casing adapted to cover the stator and the rotor, and at least a part of the casing is formed of carbon fiber reinforced plastic.

The inventors have found out that the carbon fiber reinforced plastics are the material difficult for the eddy current to occur although the carbon fiber reinforced plastics have conductivity. In the electromechanical device described above, since at least a part of the casing covering the stator and the rotor is formed of the carbon fiber reinforced plastic, it is possible to reduce the eddy-current loss caused in the casing, and thus, the efficiency of the electromechanical device can be improved.

Application Example 2

This application example is directed to the electromechanical device according to Application Example 1, wherein the casing is formed of the carbon fiber reinforced plastic in a part covering an outer peripheral part of the coil back yoke.

Since most of the magnetic flux from the rotor magnet is directed toward the coil back yoke direction, in the case of the configuration described above, by forming the part covering the outer peripheral part of the coil back yoke with the carbon fiber reinforced plastic, the eddy-current loss can efficiently be reduced to thereby improve the efficiency of the electromechanical device.

Application Example 3

This application example is directed to the electromechanical device according to Application Example 1, wherein the casing is entirely formed of the carbon fiber reinforced plastic.

In this case, it is possible to reduce not only the eddy-current loss due to the magnetic flux leaked from the rotor magnet to the outer peripheral side of the coil back yoke, but also the eddy-current loss due to the magnetic flux leaked toward other directions than the direction toward the outer peripheral side of the coil back yoke, and thus the efficiency of the electromechanical device can be improved.

Application Example 4

This application example is directed to the electromechanical device according to any one of Application Examples 1 through 3, wherein a central part of the rotor is formed of the carbon fiber reinforced plastic.

In this case, since the carbon fiber reinforced plastic is superior in a lightweight property, rigidity, and so on compared to steel materials used as the constituent material of the rotor in the related art, it is possible to constitute the rotor superior in the lightweight property, rigidity, and so on compared to the related art, and as a result, it becomes possible to constitute the electromechanical device superior in the lightweight property, rigidity, and so on.

Application Example 5

This application example is directed to the electromechanical device according to any one of Application Examples 2 through 4, which further includes a rotating mechanism section housed inside the rotor, and coupled to the rotor.

In this case, it is possible to reduce the eddy-current loss caused in the casing of the electromechanical device provided with the rotating mechanism section, and thus the efficiency of the electromechanical device can be improved.

Application Example 6

This application example is directed to the electromechanical device according to Application Example 5, wherein the rotating mechanism section is formed of the carbon fiber reinforced plastic in at least an interlocking rotating section rotating in tandem with the rotor.

In this case, since the carbon fiber reinforced plastic is superior in a lightweight property, rigidity, and so on compared to steel materials used as the constituent material of the interlocking rotating section of the rotating mechanism section in the related art, it is possible to constitute the interlocking rotating section of the rotating mechanism section superior in the lightweight property, rigidity, and so on compared to the related art, and as a result, it becomes possible to constitute the electromechanical device provided with the rotating mechanism section superior in the lightweight property, rigidity, and so on.

It should be noted that the invention can be realized in various forms such as an electrical movable body and an electrical movable robot using the electromechanical device, or medical equipment, besides an electromechanical device (rotating electromechanical device) such as an electric motor device (motor) or an electric generator.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figures 1A, 1B:
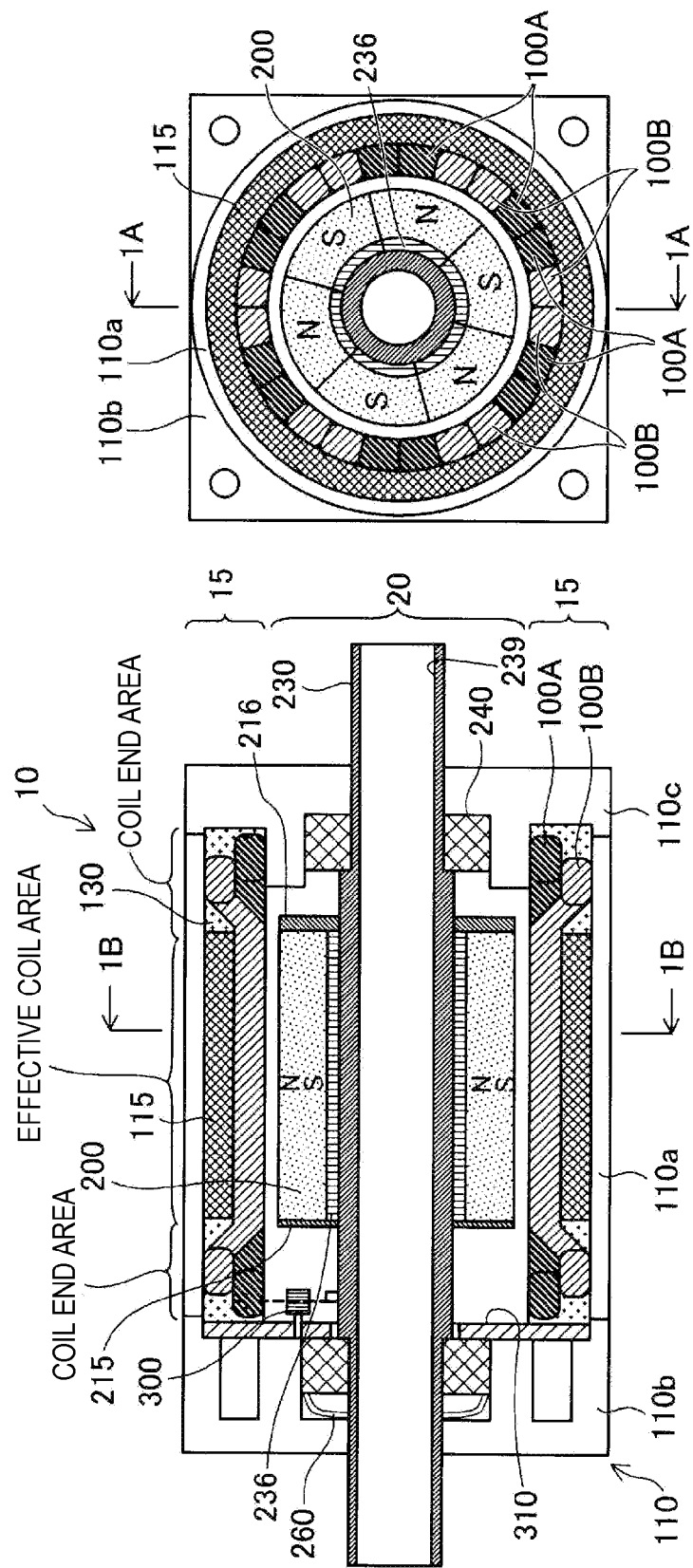
FIGS. 1A and 1B are explanatory diagrams showing a configuration of a coreless motor according to a first embodiment of the invention.

FIGS. 1A and 1B are explanatory diagrams showing a configuration of a coreless motor 10 according to a first embodiment of the invention. FIG. 1A schematically shows a cross-sectional view of the coreless motor 10 cut by a plane (the cutting plane 1A-1A in FIG. 1B) parallel to a central shaft 230, and FIG. 1B schematically shows a cross-sectional view of the coreless motor 10 cut by a plane (the cutting plane 1B-1B in FIG. 1A) perpendicular to the central shaft 230.

The coreless motor 10 is an inner rotor motor having a stator 15 with a roughly cylindrical shape disposed outside and a rotor 20 with a roughly cylindrical shape disposed inside. The stator 15 and the rotor 20 are housed in a casing 110. The stator 15 is provided with magnetic coils 100A, 100B, and a coil back yoke 115. The rotor 20 is provided with the central shaft 230, a magnetic back yoke 236, magnetic side yokes 215, 216, rotor magnets 200, and bearings 240.

The rotor 20 has the central shaft 230 as a rotating shaft, and in the outer periphery of the central shaft 230, there is disposed the magnetic back yoke 236 having a roughly cylindrical shape. Along the outer periphery of the magnetic back yoke 236, there are disposed six rotor magnets 200 in a roughly cylindrical manner. As the six rotor magnets 200, there are used permanent magnets magnetized in a direction (a radiation direction) from the center of the central shaft 230 toward the outside, and permanent magnets magnetized in a direction (a centripetal direction) from the outside toward the center. The rotor magnets 200 having the centripetal magnetization direction and the rotor magnets 200 having the radiation magnetization direction are arranged alternately along the circumferential direction. On the ends of the rotor magnets 200 in the direction (hereinafter simply referred to an "axial direction") along the central shaft 230, there are disposed the magnetic side yokes 215, 216. The magnetic side yokes 215, 216 are each a member having a roughly annular disk shape made of soft magnetic material. The central shaft 230 is made of nonmagnetic material such as carbon fiber reinforced plastics, and has a through hole 239. The central shaft 230 is attached to the casing 110 while being supported by the bearings 240. The bearings 240 can be formed of, for example, ball bearings. Further, in the present embodiment, a wave spring washer 260 is disposed inside the casing 110, and the wave spring washer 260 functions to position the rotor magnets 200. It should be noted that the wave spring washer 260 can be eliminated.

The casing 110 is a housing having a roughly cylindrical shape. Along the inner periphery of the casing 110, there are arranged two phases of magnetic coils 100A, 100B. The magnetic coils 100A, 100B each have an effective coil area and a coil end area. Here, the effective coil area denotes an area where the Lorentz force in the rotational direction is applied to the rotor 20 when a current flows through the magnetic coils 100A, 100B, and the coil end area denotes an area where the Lorentz force in a direction (mainly a direction perpendicular to the rotational direction) different from the rotational direction is applied to the rotor 20 when the current flows through the magnetic coils 100A, 100B. It should be noted that there are two coil end areas located on both sides of the effective coil area, and the Lorentz forces of the respective areas have the same levels and directions opposite to each other, and therefore, cancel each other out. In the effective coil area, the conductive wiring constituting the magnetic coils 100A, 100B is disposed in roughly parallel to the rotating shaft, and in the coil end areas, the conductive wiring constituting the magnetic coils 100A, 100B is disposed in parallel to the rotational direction. Further, although in the effective coil area the magnetic coils 100A, 100B overlap the rotor magnets 200, in the coil end areas, the magnetic coils 100A, 100B do not overlap the rotor magnets 200. It should be noted that the magnetic coils 100A, 100B are collectively called magnetic coils 100. Between the magnetic coils 100A, 100B and the casing 110, there is disposed the coil back yoke 115. The length of the coil back yoke 115 in the axial direction is roughly equal to the length of the rotor magnets 200 in the axial direction. The radial lines drawn in the radiation direction from the central shaft 230 toward the coil back yoke 115 exactly penetrate the rotor magnets 200. In other words, the coil back yoke 115 and the rotor magnets 200 overlap each other.

The stator 15 is further provided with magnetic sensors 300 as position sensors for detecting the phase of the rotor 20 disposed respectively to the phases of the magnetic coils 100A, 100B. It should be noted that FIG. 1A shows one of the pair of magnetic sensors 300 alone. The magnetic sensors 300 are fixed on a circuit board 310, and the circuit board 310 is fixed to the casing 110. Here, the magnetic sensors 300 are disposed on the vertical line drawn from the coil end area to the central shaft 230.

It should be noted that the coreless motor 10 is assembled roughly in the following procedure. Firstly, the rotor 20 is assembled so that one bearing 240 of the rotor 20 is attached to a second casing 110b. Subsequently, a first casing 110a having the magnetic coils 100A, 100B arranged in the inner periphery thereof is attached to the second casing 110b. Then, a third casing 110c is attached to the first casing 110a so that the other bearing 240 attached to the rotor 20 is attached to the third casing 110c. Thus, the coreless motor 10 is assembled.

Incidentally, in the past, as the casing 110 for housing the rotor 20 and the stator 15, there has been adopted a casing manufactured using a metal easy to provide sufficient lightweight property, strength property, heat-resistance property, and so on such as aluminum. However, in the present embodiment, there is adopted a casing manufactured using carbon fiber reinforced plastics (CFRP) superior in a lightweight property, thermal conductivity, a heat-resistance property, workability, productivity, low price, and so on. The reason for using the carbon fiber reinforced plastics will be explained below. It should be noted that in the manufacturing of the casing using the carbon fiber reinforced plastics, a molding method suitable for the molded shape is appropriately selected from a variety of general molding methods such as autoclave molding, vacuum bag molding, filament winding molding, hand lay-up molding, RTM molding, and VART molding, and is then performed.

Figure 2:
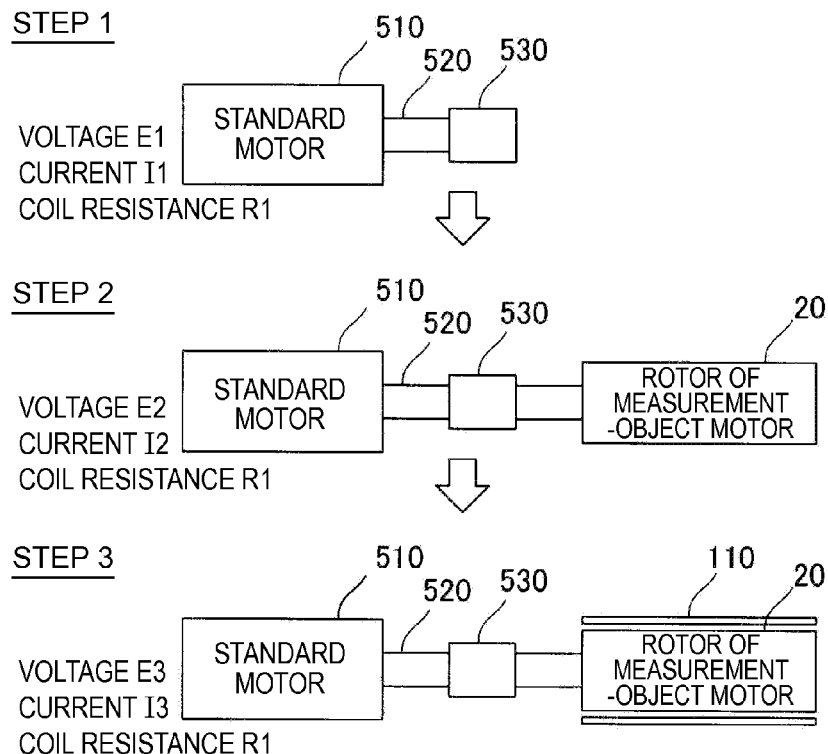
FIG. 2 is an explanatory diagram showing an example of a measuring method of an eddy-current loss generated in a casing.

FIG. 2 is an explanatory diagram showing an example of a measuring method of an eddy-current loss generated in the casing. In the step 1, firstly, the loss characteristics of a standard motor 510 are measured. A coupling 530 for connecting the motor 10 as an object of the measurement is attached to a central shaft 520 of the standard motor 510. In this state, the voltage E1 and the current I1 applied to the standard motor 510 are measured while rotating the standard motor 510 at a predetermined rotational speed N. The rotation state in this case corresponds to a so-called no-load rotation state. The first gross loss P1all of the standard motor 510 in this case is obtained by E1×I1. Further, the first gross loss P1all corresponds to the sum of a mechanical loss P1m and a copper loss P1cu and an iron loss P1fe. Here, defining the electrical resistance of the magnetic coil of the standard motor 510 as R1, the copper loss P1cu is expressed as $I1^2 \times R1$.

In the step 2, only the rotor 20 of the motor 10 as the measurement object is connected to the standard motor 510, and the voltage E2 and the current I2 applied to the standard motor 510 are measured while rotating the standard motor 510 at the same rotational speed N as in the step 1. A second gross loss P2all in this case is obtained as E2×I2. It should be noted that the second gross loss P2all corresponds to what is obtained by adding the mechanical loss P2m of the motor 10 as the measurement object to the first gross loss P1all. In other words, the difference (P2all−P1all) between the second gross loss P2all and the first gross loss P1all corresponds to the mechanical loss P2m of the motor 10 as the measurement object.

In the step 3, the voltage E3 and the current I3 applied to the standard motor 510 are measured while rotating the rotor 20 of the motor 10 as the measurement object added with the casing 110 at the same rotational speed N as in the steps 1 and 2. The gross loss P3all of the standard motor 510 in this case is obtained by E3×I3. Further, the gross loss P3all is obtained by adding the eddy-current loss Peddy due to the eddy current caused in the casing 110 to the gross loss P2all measured in the step 2. Here, the eddy current denotes an eddy-like current caused in a conductive body such as a metal plane (made of, e.g., aluminum) due to the electromagnetic induction effect when moving the conductive body in a high magnetic field or rapidly varying the magnetic field in the vicinity of the conductive body. The eddy-current loss Peddy of the motor 10 as the measurement object can be calculated by (P3all−P2all).

Figure 3:
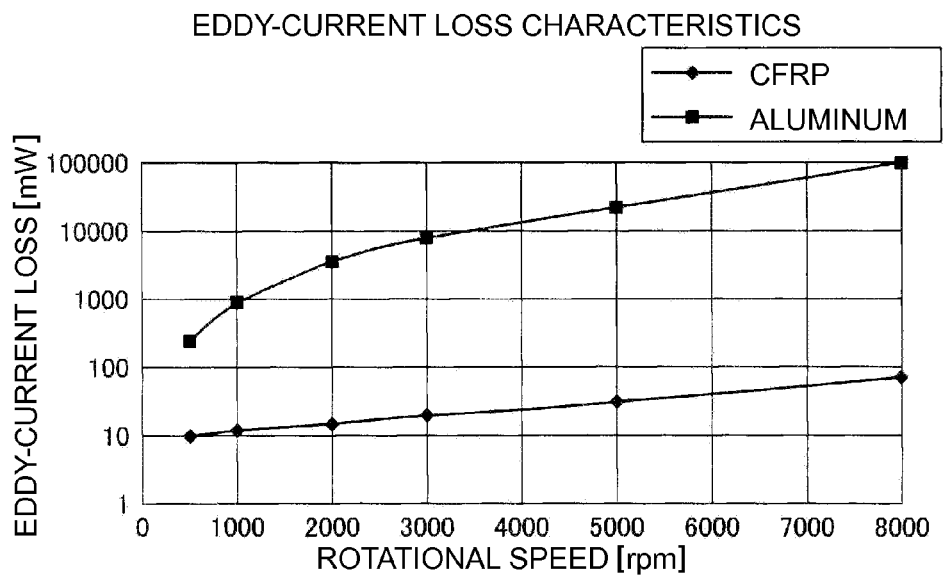
FIG. 3 is an explanatory diagram for comparing the eddy-current loss with the casing made of carbon fiber reinforced plastics and the eddy-current loss with the casing made of aluminum.

FIG. 3 is an explanatory diagram for comparing the eddy-current loss with the casing 110 made of carbon fiber reinforced plastic and the eddy-current loss with the casing made of aluminum. In the present embodiment, it is conceivable that when the rotor 20 rotates, the rotor magnets 200 also rotate, and therefore, the eddy current is caused in the casing 110 located outside the rotor magnets due to the rotation (movement) of the rotor magnets 200.

In the past, it has been considered that the carbon fiber reinforced plastics have conductivity, and therefore, if the casing 110 is made of the carbon fiber reinforced plastics, the eddy current is not so much reduced compared to the case of making the casing 110 using metal. However, in the case of manufacturing the casing 110 using the carbon fiber reinforced plastics, and then measuring the eddy-current loss, there can be obtained the result that the eddy-current loss is extremely lower (about 1/20 through about 1/2000) with the casing 110 made of the carbon fiber reinforced plastics compared to the case with the casing made of aluminum as shown in FIG. 3.

Figure 4:
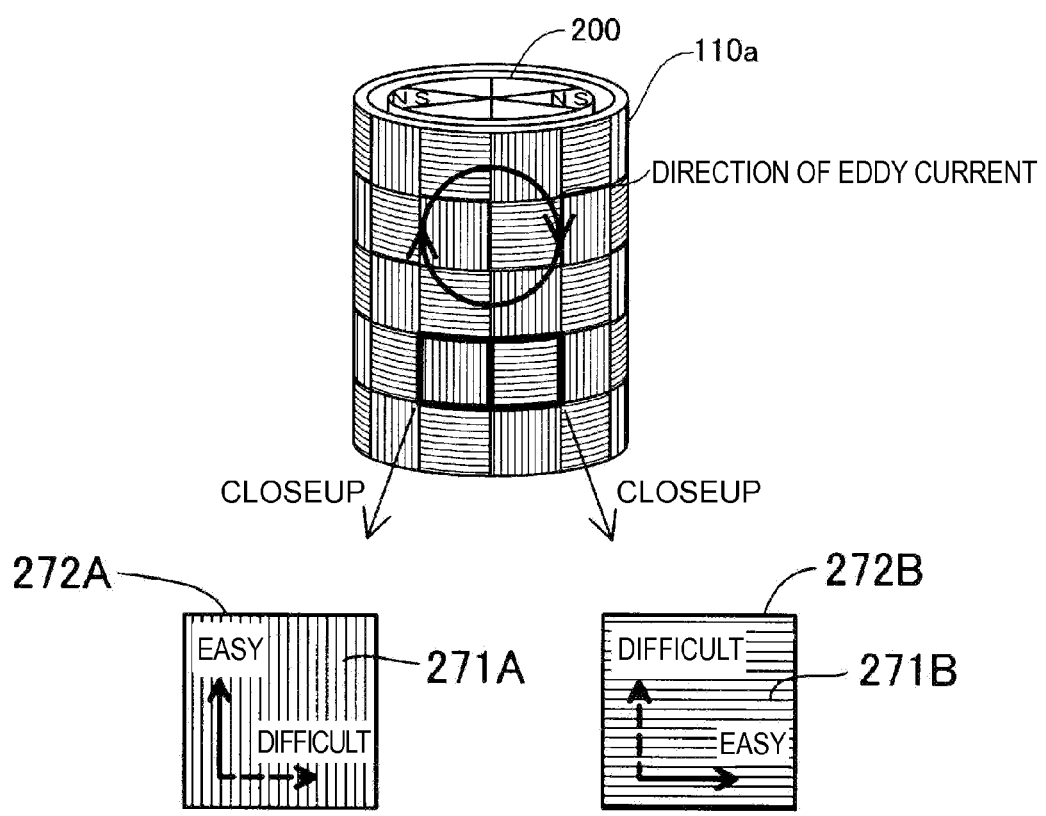
FIG. 4 is an explanatory diagram for explaining the reason that the eddy current with the casing made of carbon fiber reinforced plastics is lower.

FIG. 4 is an explanatory diagram for explaining the reason that the eddy current with the casing made of carbon fiber reinforced plastic is lower. In the present embodiment, the casing 110 is formed by weaving a carbon fiber bundle 272A and a carbon fiber bundle 272B using a square weave called yotsume-ami. Here, the carbon fiber bundle 272A has carbon fibers 271A oriented in a direction parallel to the central shaft 230 (FIG. 1A), and the carbon fiber bundle 272B has carbon fibers 271B oriented in a direction along the circumference of the central shaft 230 (FIG. 1A).

The eddy current flows, for example, on the surface of the cylindrical surface of the first casing 110a constituting the casing 110 in a closed path so as to draw a roughly circular shape. Firstly, the eddy current flowing through the carbon fiber bundle 272A is considered. The eddy current flows in the closed path so as to draw a roughly circular shape, and therefore, flows in various directions with respect to the orientation of the carbon fibers 271A. Here, the case in which the current flows in the direction along the carbon fibers 271A and the direction intersecting with the carbon fibers 271A is considered. In the case in which the current flows in the direction along the carbon fibers 271A, it is sufficient for the electrons to move on the same carbon fiber 271A. Therefore, the current is relatively easy to flow. In contrast, in the case in which the current flows in the direction intersecting with the carbon fibers 271A, it is required for the electrons to transfer to the adjacent carbon fiber 271A via resin, through which the current is difficult to flow. Therefore, the current is difficult to flow in the direction intersecting with the carbon fibers 271A. The eddy current flows in the closed path drawing the roughly circular shape as described above, and the closed path includes a part where the current flows in a direction along the carbon fibers 271A, and a part where the current flows in a direction intersecting with the carbon fibers 271A. Here, the current is difficult to flow the part where the current flows in the direction intersecting with the carbon fibers 271A as described above, and the part forms a so-called rate-limiting path (a bottleneck). The same can be applied to the eddy current flowing through the carbon fiber bundle 272B, and the part where the current flows in the direction intersecting with the carbon fibers 271B forms a so-called rate-limiting path (a bottleneck).

Further, regarding the eddy current straddling the carbon fiber bundles 272A, 272B, since the resin exists between the carbon fibers 271A of the carbon fiber bundle 272A and the carbon fibers 271B of the carbon fiber bundle 272B, the migration of the electrons between the carbon fiber 271A and the carbon fiber 271B is difficult to occur. Therefore, the current straddling the carbon fiber bundles 272A, 272B is also difficult to flow, and a so-called rate-limiting path (a bottleneck) is formed. For the reason described above, since the rate-limiting part (the bottleneck) where the current is difficult to flow exists somewhere in the closed path in the first casing 110a made of carbon fiber reinforced plastics, the eddy current becomes difficult to flow. It should be noted that although the drawing and the illustration will be omitted, the same can be applied to the surface of the second casing 110b and the third casing 110c, and the eddy current becomes difficult to flow.

As described above, the reason that the carbon fiber reinforced plastics are used as the material of the casing 110 is that the eddy-current loss can be reduced to thereby improve the efficiency of the coreless motor 10 in addition to the fact that the carbon fiber reinforced plastics are superior in a lightweight property, thermal conductivity, a heat-resistance property, workability, productivity, low price, and so on, and are therefore capable of replacing the metal material in the related art.

It should be noted that in the present embodiment, since the surfaces of the rotor magnets 200 on the central side are covered by the magnetic back yoke 236, and the surfaces thereof on the axial sides are covered by the magnetic back yokes 215, 216, the magnetic flux leakage in the axial direction from the rotor magnets 200 can be prevented. Further, since the magnetic flux leakage in the centripetal direction of the rotor magnets can be prevented by the magnetic back yoke 236, a nonmagnetic material such as a resin composite material such as carbon fiber reinforced plastics (CFRP) or glass fiber reinforced plastics (GFRP), ceramics, a plant fiber material, or a resin material can be used for the central shaft 230 corresponding to the central part of the rotor, and weight saving is easier compared to a steel material. In particular, if the carbon fiber reinforced plastic is used, the rigidity even higher than that of the steel material can be obtained in addition to the weight saving, and at the same time, it is possible to reduce the eddy-current loss caused by the magnetic flux variation in the magnetic coils to thereby improve the efficiency of the coreless motor 10.

B. Second Embodiment

Figure 5:
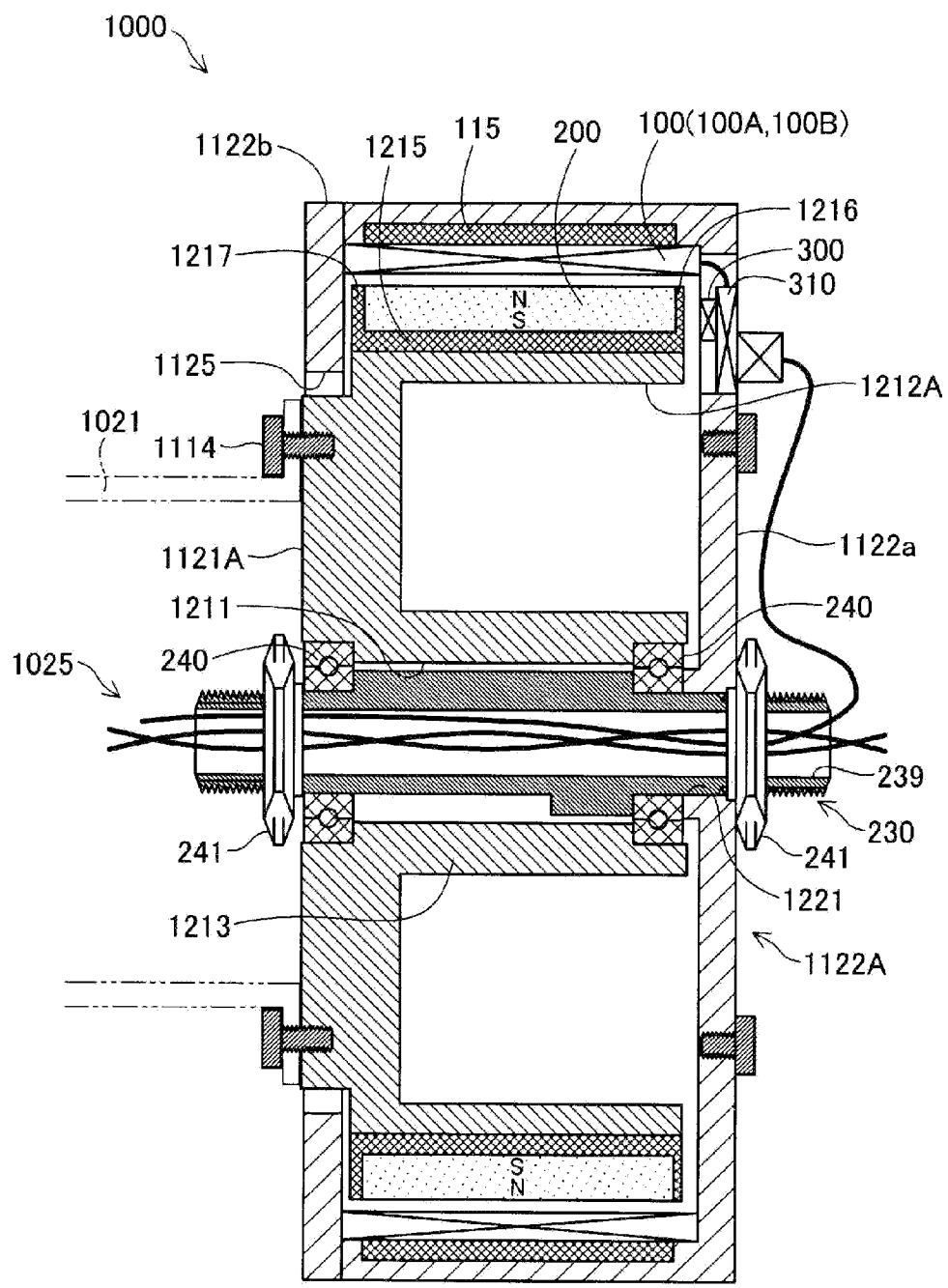
FIG. 5 is a schematic cross-sectional view showing a configuration of a coreless motor according to a second embodiment of the invention.

FIG. 5 is a schematic cross-sectional view showing a configuration of a coreless motor 1000 according to a second embodiment of the invention. The coreless motor 1000 is provided with a rotor 1121A rotating around the central shaft 230 unlike the rotor 20 in the first embodiment. The rotor 1121A is housed in a casing 1122A. The central shaft 230 has a through hole 239 extending in the axial direction, and a conductive wire bundle 1025 is inserted in the through hole 239.

The casing 1122A has a structure composed of a first casing 1122a and a second casing 1122b integrated with each other. The first casing 1122a is a hollow container having a roughly cylindrical shape with one side in the central shaft 230 direction opened. The second casing 1122b has a roughly annular disk shape having an opening section 1125 formed in the central part. At the center of the bottom of the first casing 1122a, there is formed a through hole 1221 for inserting the central shaft 230. The central shaft 230 and the first casing 1122a are fixedly attached to each other. It should be noted that, for example, the second casing 1122b is bonded to the first casing 1122a with an adhesive to thereby be integrated therewith after housing the rotor 1121A in the hollow section of the first casing 1122a centered on the central shaft 230. On this occasion, the bottom of the rotor 1121A is disposed in the opening section 1125 of the second casing 1122b. Further, it is also possible to arrange that the second casing 1122b is fixed to the first casing 1122a with a bolt. The first casing 1122a and the second casing 1122b of the casing 1122A are manufactured using the carbon fiber reinforced plastic as the material similarly to the casing 110 of the first embodiment.

The rotor 1121A has a roughly annular disk shape, and on the outer peripheral surface of the sidewall, there are arranged the rotor magnets 200 in a roughly cylindrical manner. The direction of the magnetic flux of the rotor magnets 200 is the radiation direction. It should be noted that the magnetic back yoke 1215 for improving the magnetic force efficiency is disposed on the surface (the surface on the sidewall side of the rotor 1121A) on the reverse side of the rotor magnets 200, and the magnetic side yokes 1216, 1217 are disposed on the end surfaces in the direction along the central shaft 230.

The rotor 1121A has the through hole 1211 for inserting the central shaft 230 disposed at the center thereof. It should be noted that between the inner wall surface of the through hole 1211 and the outer peripheral surface of the central shaft 230, there are disposed the bearings 240 for making the rotor 1121A rotatable around the central shaft 230.

On the bottom side (on the right side in the sheet of FIG. 5) of the first casing 1122a of the rotor 1121A, there is disposed a recessed section 1212A formed as a roughly annular groove centered on the through hole 1211. It should be noted that the recessed section 1212A is for weight saving of the rotor 1121A, and can therefore be eliminated.

On the inner peripheral surface of the first casing 1122a, the magnetic coils 100 (100A, 100B) are arranged in a roughly cylindrical manner so as to be opposed to the rotor magnets 200 of the rotor 1121 with a clearance. In other words, in the coreless motor 1000, the magnetic coils 100 function as the stator to thereby rotate the rotor 1121A around the central shaft 230. It should be noted that between the magnetic coils 100 and the first casing 1122a, there is disposed the coil back yoke 115 for improving the magnetic force efficiency. It should be noted that the positional relationship between the rotor magnets 200, the magnetic coils 100 and the coil back yoke 115 is the same as the relationship explained in the first embodiment.

On the bottom of the first casing 1122a, there are disposed the position detection section 300 (also referred to as a "magnetic sensor 300") for detecting the position of the rotor magnet 200, and a circuit board 310 provided with a rotation control circuit for controlling the rotation of the rotor 1121A. The position detection section 300 is formed of, for example, a Hall device, and is disposed so as to correspond to the position of the orbit of the rotor magnet 200. The position detection section 300 is disposed on, or connected via signal lines to the circuit board 310.

To the circuit board 310, there is connected a conductive wire branched from the conductive wire bundle 1025. Further, the circuit board 310 is electrically connected to the magnetic coils 100. The circuit board 310 transmits a detection signal output by the position detection section 300 to a control section (not shown) for controlling drive of a motive power generation device 1100. Further, the rotation control circuit of the circuit board 310 supplies the magnetic coils 100 with electrical power to generate the magnetic field in accordance with the control signal from the control section to thereby rotate the rotor 1121A.

The bottom (the bottom on the left side of the sheet of FIG. 5) of the rotor 1121A disposed to the opening section 1125 also has a function as a load coupling section, and a rotating shaft of an external load device 1021 is fixed thereto with a fixing bolt 1114.

To the central shaft 230, there are attached bearing rings 241 for enhancing a holding property of the central shaft 230 in a fitting manner on the outer side (on the right side of the sheet of FIG. 5) of the first casing 1122a and the outer side (on the left side of the sheet of FIG. 5) of the rotor 1121A, respectively. It should be noted that the bearing rings 241 shown in the drawing are shown as a side view instead of a cross-sectional view for the sake of easy understanding.

As described above, also in the present embodiment, since the eddy-current loss can be reduced using the carbon fiber reinforced plastics superior in a lightweight property, rigidity, thermal conductivity, a heat-resistance property, workability, productivity, low price, and so on as the material of the casing 1122A, it is possible to improve the efficiency of the coreless motor 1000.

It should be noted that in the present embodiment, since the surfaces of the rotor magnets 200 on the central side is covered by the magnetic back yoke 1215, and the end surfaces thereof in the axial direction are covered by the magnetic side yokes 1216, 1217, similarly to the central shaft 230 as the central part of the rotor of the coreless motor 10 according to the first embodiment, a nonmagnetic material such as a resin composite material such as carbon fiber reinforced plastics (CFRP) or glass fiber reinforced plastics (GFRP), ceramics, a plant fiber material, or a resin material can be used for the member constituting the central part of the rotor 1121A to which the central shaft 230, the rotor magnets 200, and so on are disposed, and weight saving is easy. In particular, if the carbon fiber reinforced plastic is used, the weight saving is possible compared to the steel material, and at the same time, the rigidity even higher than that of the steel material can be obtained in addition to the weight saving, and at the same time, it is possible to reduce the eddy-current loss caused by the magnetic flux from the magnetic coils to thereby improve the efficiency of the coreless motor 1000.

C. Third Embodiment

Figure 6:
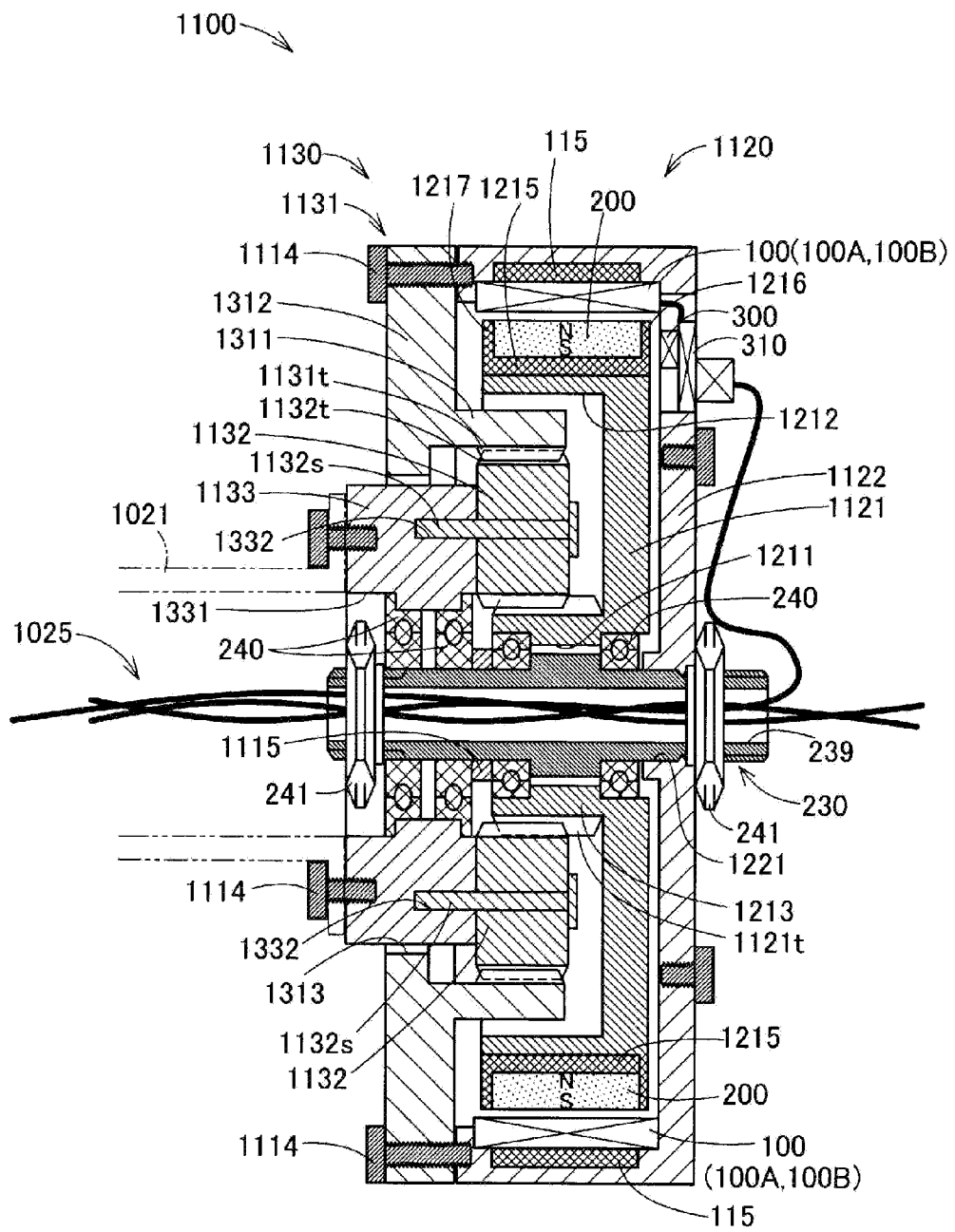
FIG. 6 is a schematic cross-sectional view showing a configuration of a motive power generating device according to a third embodiment of the invention.

FIG. 6 is a schematic cross-sectional view showing a configuration of a motive power generating device 1100 according to a third embodiment of the invention. The motive power generation device 1100 is provided with the central shaft 230, a motor section 1120, and a rotating mechanism section 1130. As described later, the motor section 1120 and the rotating mechanism section 1130 are integrally fitted with each other, and the central shaft 230 is disposed so as to penetrate the center of the motor section 1120 and the rotating mechanism section 1130 thus integrated. The central shaft 230 has a through hole 239 extending in the axial direction, and a conductive wire bundle 1025 is inserted in the through hole 239.

The motor section 1120 is provided with the rotor 1121 and the casing 1122. The rotor 1121 has a roughly annular disk shape, and on the outer peripheral surface of the sidewall, there are arranged the rotor magnets 200 in a roughly cylindrical manner. The direction of the magnetic flux of the rotor magnets 200 is the radiation direction. It should be noted that the magnetic back yoke 1215 for improving the magnetic force efficiency is disposed on the surface (the surface on the sidewall side of the rotor 1121) on the reverse side of the rotor magnets 200, and the magnetic side yokes 1216, 1217 are disposed on the end surfaces in the direction along the central shaft 230.

The rotor 1121 has the through hole 1211 for inserting the central shaft 230 disposed at the center thereof. It should be noted that between the inner wall surface of the through hole 1211 and the outer peripheral surface of the central shaft 230, there are disposed the bearings 240 for making the rotor 1121 rotatable around the central shaft 230.

On the surface on the side opposed to the rotating mechanism section 1130 of the rotor 1121, there is disposed a recessed section 1212 formed as a groove having a roughly annular shape centered on the through hole 1211. The outer wall surface of a partition wall 1213 having a roughly cylindrical shape for separating the through hole 1211 and the recessed section 1212 is provided with gear teeth 1121t. Hereinafter, the partition wall 1213 having the gear teeth 1121t and disposed at the center of the rotor 1121 is also referred to as a "rotor gear 1213." It should be noted that the rotor gear 1213 in the present embodiment functions as a sun gear of a planetary gear train.

The casing 1122 is a hollow container having a roughly cylindrical shape, and houses the rotor 1121. A side of the casing 1122, which is opposed to the rotating mechanism section 1130, is opened. Similarly to the casing 1122A of the second embodiment, the casing 1122 is manufactured using the carbon fiber reinforced plastic as the material.

At the center of the bottom (the surface on the right side of the sheet of FIG. 6) of the casing 1122, there is formed a through hole 1221 for inserting the central shaft 230. The central shaft 230 and the casing 1122 are fixedly attached to each other. Further, on the outer sides of the casing 1122, there are attached the bearing rings 241 for enhancing the holding property of the central shaft 230 in a fitting manner. It should be noted that also in FIG. 6, the bearing rings 241 are shown as a side view instead of a cross-sectional view for the sake of easy understanding.

On the inner peripheral surface of the casing 1122, the magnetic coils 100 (100A, 100B) are arranged in a cylindrical manner so as to be opposed to the rotor magnets 200 of the rotor 1121 with a clearance. In other words, in the motor section 1120, the magnetic coils 100 function as the stator to thereby rotate the rotor 1121 around the central shaft 230. It should be noted that between the magnetic coils 100 and the casing 1122, there is disposed the coil back yoke 115 for improving the magnetic force efficiency. It should be noted that the positional relationship between the rotor magnets 200, the magnetic coils 100 and the coil back yoke 115 is the same as the relationship explained in the first embodiment.

On the bottom of the casing 1122, there are disposed the position detection section 300 for detecting the position of the rotor magnet 200, and the circuit board 310 provided with the rotation control circuit for controlling the rotation of the rotor 1121. The position detection section 300 is formed of, for example, a Hall device, and is disposed so as to correspond to the position of the orbit of the rotor magnet 200. The position detection section 300 is disposed on, or connected via signal lines to the circuit board 310.

To the circuit board 310, there is connected a conductive wire branched from the conductive wire bundle 1025. Further, the circuit board 310 is electrically connected to the magnetic coils 100. The circuit board 310 transmits a detection signal output by the position detection section 300 to a control section (not shown) for controlling drive of a motive power generation device 1100. Further, the rotation control circuit of the circuit board 310 supplies the magnetic coils 100 with electrical power to generate the magnetic field in accordance with the control signal from the control section to thereby rotate the rotor 1121.

The rotating mechanism section 1130 constitutes the planetary gear train together with the rotor gear 1213 of the rotor 1121, and functions as a reduction mechanism. The rotating mechanism section 1130 is provided with a gear fixation section 1131, three planetary gears 1132, and a load coupling section 1133. It should be noted that FIG. 6 shows only the two planetary gears 1132 for the sake of convenience.

The gear fixation section 1131 has an outer gear 1311 as a roughly annular gear provided with gear teeth 1131t formed on the inner wall surface, and a flange section 1312 projecting on the outer periphery of the outer gear 1311. The gear fixation section 1131 is fixedly attached to the motor section 1120 by fastening the flange section 1312 and a sidewall end surface of the casing 1122 of the motor section 1120 to each other with a fixing bolts 1114.

The outer gear 1311 of the gear fixation section 1131 is housed in the recessed section 1212 of the rotor 1121. Further, between the inner peripheral surface of the outer gear 1311 and the outer peripheral surface of the rotor gear 1213, there are arranged three planetary gears 1132 along the outer periphery of the rotor gear 1213 at roughly regular intervals. It should be noted that the gear teeth 1132t of the planetary gears 1132, the gear teeth 1131t of the outer gear 1311, and the gear teeth 1121t of the rotor gear 1213 are engaged with each other to thereby couple these three types of gears 1213, 1132, and 1311 to each other.

The load coupling section 1133 is a member having a roughly cylindrical shape functioning as a planetary carrier. At the center of the bottom of the load coupling section 1133, there is disposed a through hole 1331 in which the central shaft 230 is inserted. Between the inner wall surface of the through hole 1331 and the outer peripheral surface of the central shaft 230, there are disposed the bearings 240 for making the load coupling section 1133 rotatable around the central shaft 230. It should be noted that between the bearing 240 attached to the load coupling section 1133 and the bearing 240 attached to the rotor 1121, there is disposed a spacer 1115.

Here, at the central part of the gear fixation section 1131, there is formed an opening section 1313 having a roughly circular shape communicated to the inner space of the outer gear 1311, and the load coupling section 1133 is disposed in the opening section 1313. On the bottom of the load coupling section 1133 on the motor section 1120 side (on the right side of the sheet of FIG. 6), there are formed shaft holes 1332 for rotatably holding rotating shafts 1132s of the respective planetary gears 1132 housed in the recessed section 1212 of the rotor 1121.

On the outer side (on the left side of the sheet of FIG. 6) of the load coupling section 1133, there is attached the bearing ring 241 for enhancing the holding property of the central shaft 230 in a fitting manner. Further, to the outside bottom of the load coupling section 1133, there is fixed a rotating shaft of the external load device 1021 with fixing bolts 1114.

Since the outer gear 1311 is fixedly disposed in the rotating mechanism section 1130 with the configuration described above, each of the planetary gears 1132 orbits (also referred to as "revolution") around the rotor gear 1213 while rotating (also referred to as "axial rotation") around the rotating shaft 1132s of itself in accordance with the rotation of the rotor gear 1213. In accordance with the orbital movement of each of the planetary gears 1132, the load coupling section 1133 rotates, and thus, the rotational drive force is transmitted to the load coupled to the load coupling section 1133.

As described above, also in the present embodiment, since the eddy-current loss can be reduced using the carbon fiber reinforced plastics superior in a lightweight property, rigidity, thermal conductivity, a heat-resistance property, workability, productivity, low price, and so on as the material of the casing 1122, it is possible to improve the efficiency of the motive power generation device 1100.

Further, also in the present embodiment, similarly to the second embodiment, a nonmagnetic material such as a resin composite material such as carbon fiber reinforced plastics (CFRP) or glass fiber reinforced plastics (GFRP), ceramics, a plant fiber material, or a resin material can be used for the member constituting the central part of the rotor 1121 where the central shaft 230, the rotor magnets 200, and so on are disposed, and weight saving is easier compared to a steel material. In particular, if the carbon fiber reinforced plastic is used, the rigidity even higher than that of the steel material can be obtained in addition to the weight saving, and at the same time, it is possible to reduce the eddy-current loss caused by the magnetic flux variation in the magnetic coils to thereby improve the efficiency of the motive power generation device 1100. Moreover, the nonmagnetic material can be used for the load coupling section 1133 as a planetary carrier, and thus, weight saving can easily be achieved. In particular, if the carbon fiber reinforced plastic is used, the weight saving can be achieved, and at the same time, the rigidity even higher than that of the steel material can be obtained, and it is possible to reduce the eddy-current loss caused by the magnetic flux from the rotor magnets and the magnetic coils to thereby improve the efficiency of the motive power generation device 1100. It should be noted that in the present embodiment, the load coupling section 1133 as the planetary carrier corresponds to an interlocking rotating section of the rotating mechanism section.

D. Fourth Embodiment

Figure 7:
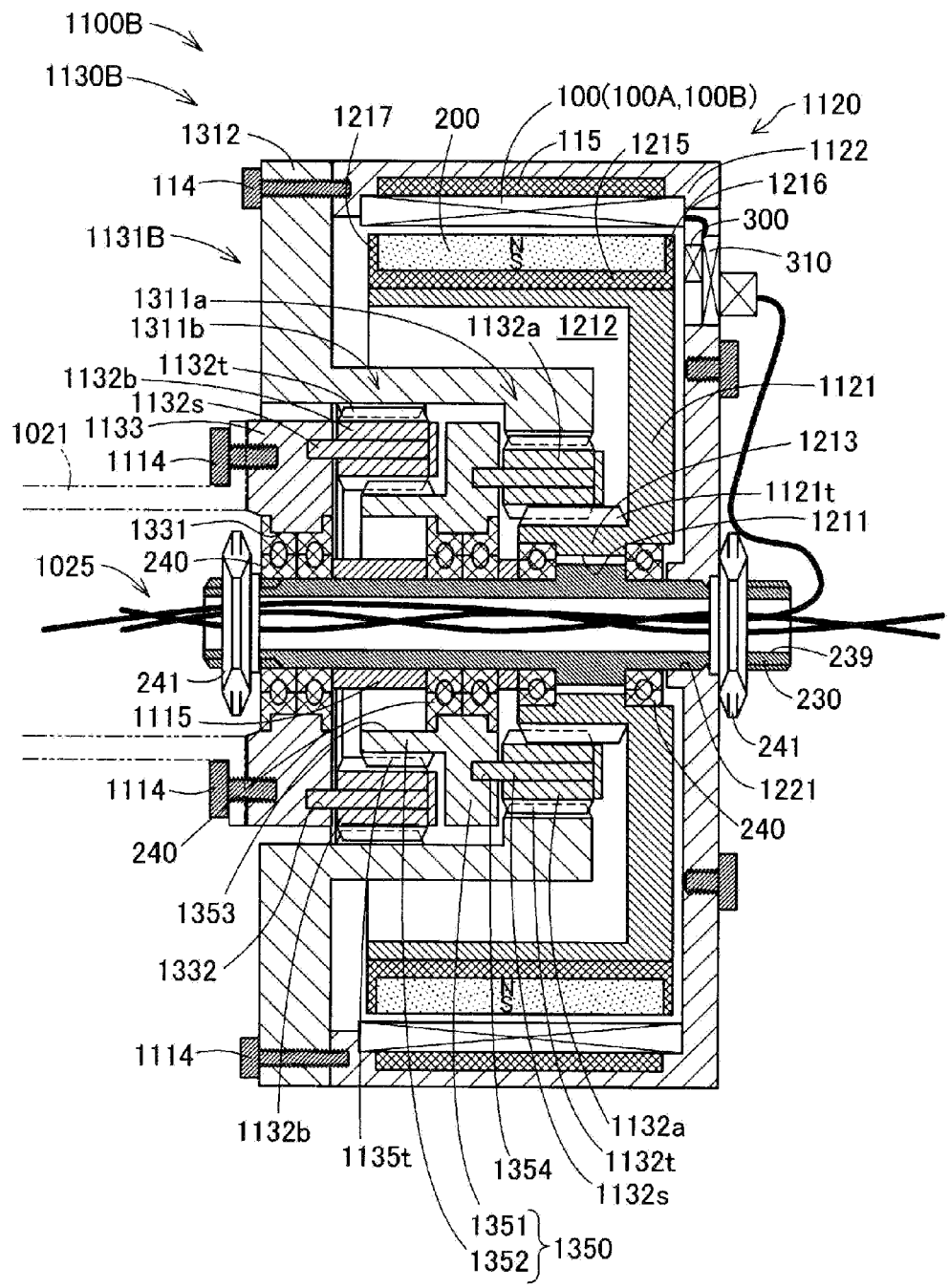
FIG. 7 is a schematic cross-sectional view showing a configuration of a motive power generating device according to a fourth embodiment of the invention.

FIG. 7 is a schematic cross-sectional view showing a configuration of a motive power generation device 1100B according to a fourth embodiment of the invention. The motive power generation device 1100B has a configuration of integrating a reduction mechanism with two-tiered planetary gear trains and a motor, and is different from the motive power generation device 1100 (FIG. 6) according to the third embodiment in the following points.

The motive power generation device 1100B has a rotating mechanism section 1130B. The gear fixation section 1131B of the rotating mechanism section 1130B is provided with first and second outer gears 1311a, 1311b arranged in tandem in the axial direction of the central shaft 230. When the gear fixation section 1131B is fixedly attached to the casing 1122, both of the first and second outer gears 1311a, 1311b are housed in the recessed section 1212 of the rotor 1121.

The first outer gear 1311a is coupled to the rotor gear 1213 via first planetary gears 1132a. In other words, the rotor gear 1213 functions as the sun gear in the first-tier planetary gear train. The first planetary gears 1132a are rotatably attached to the planetary carrier 1350.

The planetary carrier 1350 is a rotating member having an anterior part 1351 having a cylindrical shape with a relatively large diameter and a posterior part 1352 having a cylindrical shape with a relatively small diameter connected consecutively. The anterior part 1351 of the planetary carrier 1350 is disposed between the first and second outer gears 1311a, 1311b, and the bottom thereof is provided with shaft holes 1354 for holding the rotating shafts 1132s of the first planetary gears 1132a. The posterior part 1352 is provided with gear teeth 1135t formed on the sidewall surface, and at the same time, disposed in the inner space of the second outer gear 1311b.

It should be noted that at the central part of the planetary carrier 1350, there is disposed a through hole 1353 for inserting the central shaft 230 so as to penetrate both of the anterior part 1351 and the posterior part 1352. Between the through hole 1353 and the central shaft 230, there are disposed the bearings 240 for making the planetary carrier 1350 rotatable. It should be noted that between the bearings 240, there is disposed the spacer 1115 if necessary.

Between the posterior part 1352 of the planetary carrier 1350 and the second outer gear 1311b, there are disposed second planetary gears 1132b. In other words, the posterior part 1352 functions as the sun gear in the second-tier planetary gear train. The second planetary gears 1132b are rotatably attached to the load coupling section 1133 functioning as the planetary carrier.

In the first-tier planetary gear train, each of the first planetary gears 1132a orbits (revolution) around the rotor gear 1213 while rotating (axial rotation) around the rotating shaft 1132s of itself in accordance with the rotation of the rotor gear 1213. In accordance with the orbital movement of the first planetary gears 1132a, the anterior part 1351 of the planetary carrier 1350 rotates. In the second-tier planetary gear train, each of the second planetary gears 1132b orbits (revolution) on the outer periphery of the posterior part 1352 of the planetary carrier 1350 while rotating (axial rotation) around the rotating shaft 1132s of itself in accordance with the rotation of the posterior part 1352 of the planetary carrier 1350. In accordance with the orbital movement of the second planetary gears 1132b, the load coupling section 1133 rotates, and thus, the rotational drive force is transmitted to the load coupled to the load coupling section 1133.

As described above, also in the present embodiment, since the eddy-current loss can be reduced using the carbon fiber reinforced plastics superior in a lightweight property, rigidity, thermal conductivity, a heat-resistance property, workability, productivity, low price, and so on as the material of the casing 1122, it is possible to improve the efficiency of the motive power generation device 1100B.

Further, also in the present embodiment, similarly to the third embodiment, a nonmagnetic material such as a resin composite material such as carbon fiber reinforced plastics (CFRP) or glass fiber reinforced plastics (GFRP), ceramics, a plant fiber material, or a resin material can be used for the member constituting the central part of the rotor 1121 where the central shaft 230, the rotor magnets 200, and so on are disposed, and weight saving is easier compared to a steel material. In particular, if the carbon fiber reinforced plastic is used, the rigidity even higher than that of the steel material can be obtained in addition to the weight saving, and at the same time, it is possible to reduce the eddy-current loss caused by the magnetic flux variation in the magnetic coils to thereby improve the efficiency of the motive power generation device 1100B. Moreover, it is possible to use the nonmagnetic material for the planetary carrier 1350 and the load coupling section 1133 as the interlocking rotating section rotating in tandem with the rotor 1121 and the gear fixation section 1131B, and thus weight saving can easily be achieved. In particular, if the carbon fiber reinforced plastic is used, the weight saving can be achieved, and at the same time, the rigidity even higher than that of the steel material can be obtained, and it is possible to reduce the eddy-current loss caused by the magnetic flux from the rotor magnets and the magnetic coils to thereby improve the efficiency of the motive power generation device 1100B.

E. Modified Examples

It should be noted that among the constituent elements of the embodiments described above, the elements other than those recited in the appended independent claims are additional elements, and can arbitrarily be eliminated. Further, the invention is not limited to the specific examples or the embodiments described above, but can be put into practice in various forms within the scope or the spirits of the invention.

1. First Modified Example

Although in the embodiments described above the case of manufacturing the whole of the casing with the carbon fiber reinforced plastic is explained, the invention is not limited thereto. For example, it is also possible to adopt the configuration in which at least the part of the casing covering the outer peripheral part of the coil back yoke 115 corresponding to the rotor magnets 200 is formed of the carbon fiber reinforced plastic. It is arranged that the magnetic flux from the rotor magnets 200 is directed toward the radiation direction on the coil back yoke 115 side. Therefore, by forming at least the part of the casing covering the outer peripheral part of the coil back yoke 115 with the carbon fiber reinforced plastic, a significant suppressing effect of the eddy-current loss can be obtained. Further, it is also possible to adopt the configuration in which a part of the casing covering the central shaft 230 direction side of the rotor magnets 200 is formed of the carbon fiber reinforced plastic. In other words, it is sufficient that at least a part of the casing is formed of the carbon fiber reinforced plastic so as to reduce the eddy-current loss caused by the magnetic flux from the rotor magnet.

2. Second Modified Example

Although in the embodiments described above the coreless motor provided with the characteristic part of the invention and the motive power generation device provided with the coreless motor are explained as examples, the invention is not limited to an electric motor such as the coreless motor or the motive power generation device, but can also be applied to an electric generator.

3. Third Modified Example

Figure 8:
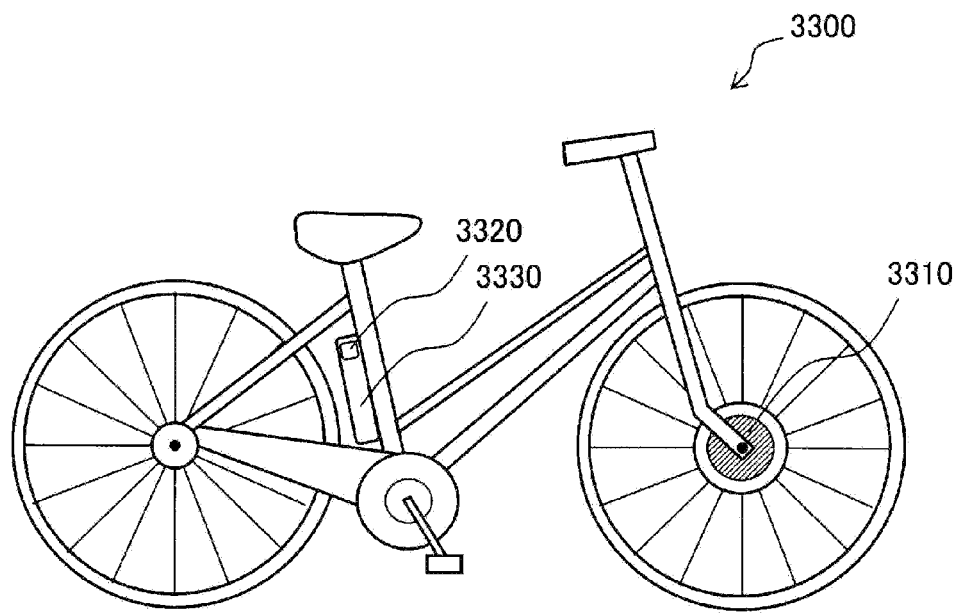
FIG. 8 is an explanatory diagram showing an electric bicycle (an electric power-assisted bicycle) as an example of a movable body using a motor/generator according to a modified example of the invention.

Further, the electric motor or the electric generator provided with the features of the invention can also be applied to an electric-powered movable body, an electric-powered movable robot, and a driving device of a medical equipment as described below. FIG. 8 is an explanatory diagram showing an electric bicycle (an electric power-assisted bicycle) as an example of a movable body using a motor/generator according to a modified example of the invention. The bicycle 3300 has an electric motor 3310 attached to the front wheel, and a control circuit 3320 and a rechargeable battery 3330 disposed on the frame below a saddle. The electric motor 3310 drives the front wheel using the electric power from the rechargeable battery 3330 to thereby assist running. Further, when breaking, the electric power regenerated by the electric motor 3310 is stored in the rechargeable battery 3330. The control circuit 3320 is a circuit for controlling the drive and regeneration of the electric motor. As the electric motor 3310, a variety of types of coreless motor 10 described above can be used.

Figure 9:
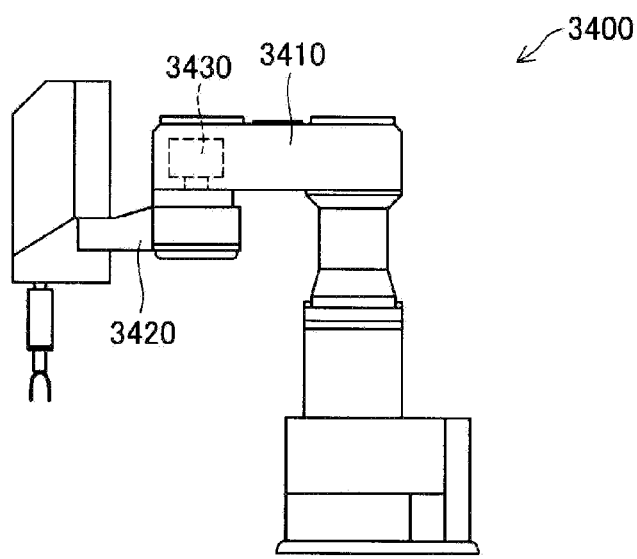
FIG. 9 is an explanatory diagram showing an example of a robot using an electric motor according to a modified example of the invention.

FIG. 9 is an explanatory diagram showing an example of a robot using an electric motor according to a modified example of the invention. The robot 3400 has first and second arms 3410, 3420, and an electric motor 3430. The electric motor 3430 is used when horizontally rotating the second arm 3420 as a driven member. As the electric motor 3430, a variety of types of coreless motor 10 described above can be used.

Figure 10:
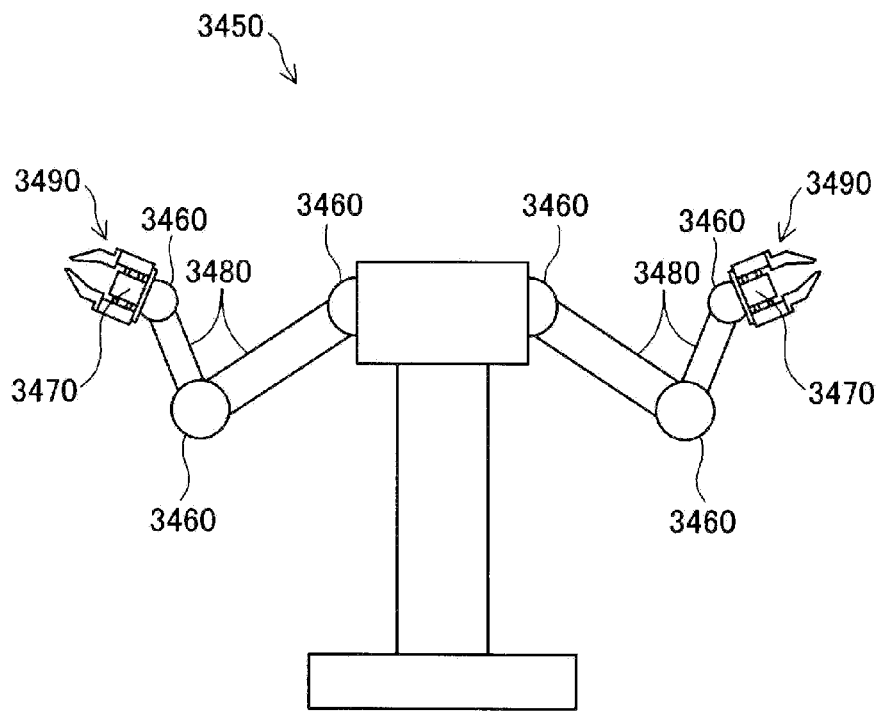
FIG. 10 is an explanatory diagram showing an example of a dual-arm 7-axis robot using an electric motor according to a modified example of the invention.

FIG. 10 is an explanatory diagram showing an example of a dual-arm 7-axis robot using an electric motor according to a modified example of the invention. The dual-arm 7-axis robot 3450 is provided with joint motors 3460, gripper motors 3470, arms 3480, and grippers 3490. The joint motors 3460 are disposed at the positions corresponding to shoulder joints, elbow joints, and wrist joints. The joint motors 3460 are each provided with two motors for each of the joints in order to operate the arms 3480 and the grippers 3490 three-dimensionally. Further, the gripper motor 3470 opens and closes the gripper 3490 to thereby make the gripper 3490 grip an object. In the dual-arm 7-axis robot 3450, the variety of types of coreless motors described above can be used as the joint motors 3460 or the gripper motors 3470.

Figure 11:
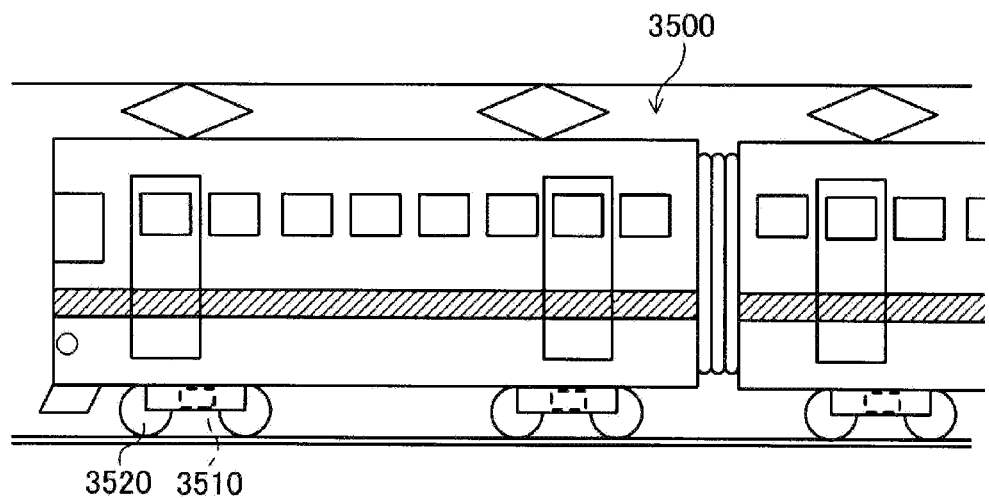
FIG. 11 is an explanatory diagram showing a railroad vehicle using an electric motor according to a modified example of the invention.

FIG. 11 is an explanatory diagram showing a railroad vehicle using an electric motor according to a modified example of the invention. The railroad vehicle 3500 has electric motors 3510 and wheels 3520. The electric motor 3510 drives the wheels 3520. Further, the electric motor 3510 is used as an electric generator when breaking the railroad vehicle 3500, and the electric power is regenerated. As the electric motors 3510, a variety of types of coreless motors 10 described above can be used.

The present application claims priority based on Japanese Patent Application No. 2011-161713 filed on Jul. 25, 2011, the disclosure of which is hereby incorporated by reference in its entirety.

What is claimed is:

1. An electromechanical device comprising:
 a rotor having
  a magnetic back yoke with a cylindrical shape, and
  at least one rotor magnet arranged along an outer periphery of the magnetic back yoke in a cylindrical manner;
 a stator having
  at least one air-core magnetic coil arranged along an outer periphery of the rotor in a cylindrical manner, and
  a coil back yoke with a cylindrical shape disposed on an outer periphery of the magnetic coil arranged in a cylindrical manner; and
 a casing adapted to cover the stator and the rotor,
 wherein at least apart of the casing is formed of carbon fiber reinforced plastic.

2. The electromechanical device according to claim 1, wherein
 the casing is formed of the carbon fiber reinforced plastic in apart covering an outer peripheral part of the coil back yoke.

3. The electromechanical device according to claim 1, wherein
 the casing is entirely formed of the carbon fiber reinforced plastic.

4. The electromechanical device according to claim 1, wherein
 a central part of the rotor is formed of the carbon fiber reinforced plastic.

5. The electromechanical device according to claim 2, further comprising:
 a rotating mechanism section housed inside the rotor, and coupled to the rotor.

6. The electromechanical device according to claim 5, wherein
 the rotating mechanism section is formed of the carbon fiber reinforced plastic in an interlocking rotating section rotating in tandem with the rotor.

7. A movable body comprising the electromechanical device according to claim 1.

8. A movable body comprising the electromechanical device according to claim 2.

9. A movable body comprising the electromechanical device according to claim 3.

10. A movable body comprising the electromechanical device according to claim 4.

11. A movable body comprising the electromechanical device according to claim 5.

12. A movable body comprising the electromechanical device according to claim 6.

13. A robot comprising the electromechanical device according to claim 1.

14. A robot comprising the electromechanical device according to claim 2.

15. A robot comprising the electromechanical device according to claim 3.

16. A robot comprising the electromechanical device according to claim 4.

17. A robot comprising the electromechanical device according to claim 5.

18. A robot comprising the electromechanical device according to claim 6.

* * * * *